M. LIVINGSTON.
DRENCHING BOTTLE.
APPLICATION FILED SEPT. 10, 1907.

907,256.

Patented Dec. 22, 1908.

Witnesses
Jas. V. McCathran
T. F. Riley

Miles Livingston, Inventor
By C. G. Siggers
Attorney

UNITED STATES PATENT OFFICE.

MILES LIVINGSTON, OF HERSCHER, ILLINOIS.

DRENCHING-BOTTLE.

No. 907,256.            Specification of Letters Patent.        Patented Dec. 22, 1908.

Application filed September 10, 1907. Serial No. 392,147.

*To all whom it may concern:*

Be it known that I, MILES LIVINGSTON, a citizen of the United States, residing at Herscher, in the county of Kankakee and State of Illinois, have invented a new and useful Drenching-Bottle, of which the following is a specification.

The invention relates to improvements in drenching bottles.

The object of the present invention is to improve the construction of drenching bottles, and to provide a simple, durable and practical drenching bottle for the administration of medicine to horses, cattle, and other domestic animals, and capable of enabling the lips of an animal to close enough to permit the animal to swallow naturally, whereby medicine may be administered to such animals without either injuring the same or spilling the medicine.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
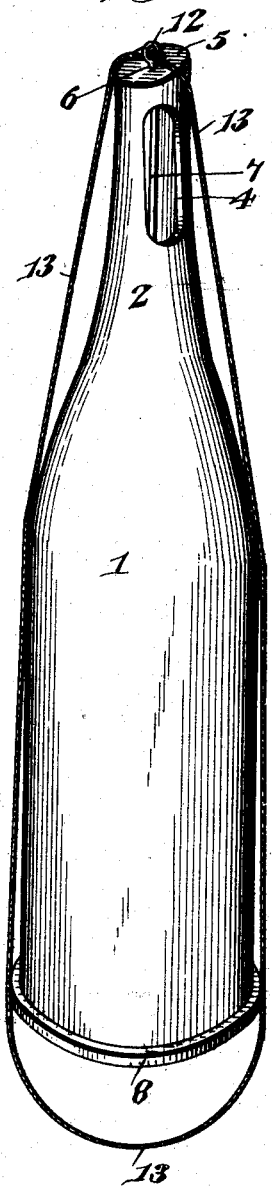
Figure 2:
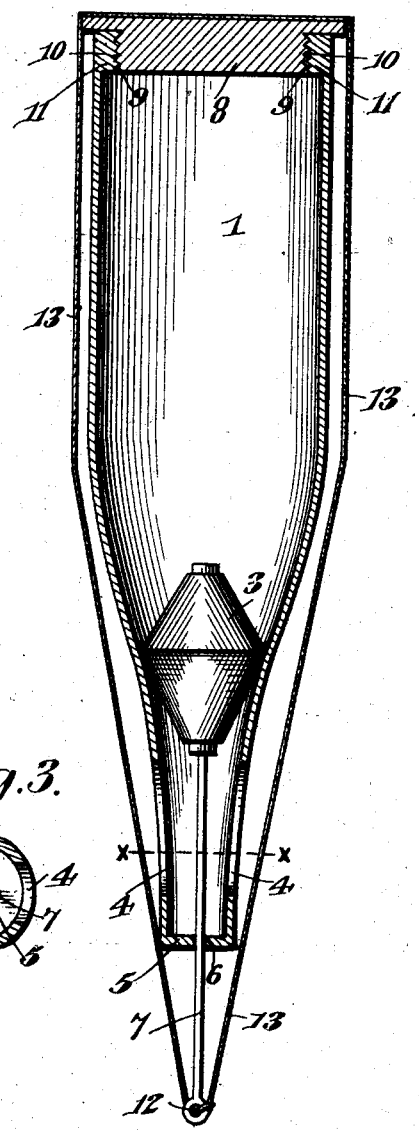
Figure 3:
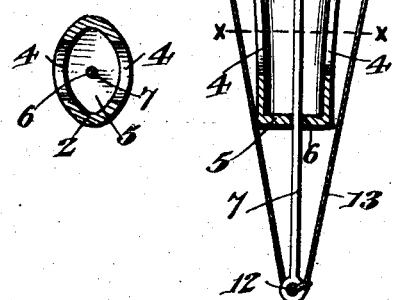

In the drawing:—Figure 1 is a perspective view of a drenching bottle, constructed in accordance with this invention. Fig. 2 is a longitudinal sectional view, the bottle being inverted. Fig. 3 is a transverse sectional view, taken substantially on the line $x$—$x$ of Fig. 2.

Like numerals of reference designate corresponding parts in all the figures of the drawing.

1 designates a drenching bottle, designed in practice to have its body portion constructed of sheet copper, or other suitable material and to have its neck portion 2 made of steel, or other hard material so as not to be injured by the teeth of the animal. The body tapers towards the neck 2 to provide a seat for an interiorly arranged valve 3, and the said neck 2, which is flattened into elliptical form, as clearly illustrated in Fig. 3 of the drawing, is provided with opposite outlet openings 4. The flattening of the neck of the bottle or receptacle is adapted to permit the lips of a horse or other domestic animal to approach each other sufficiently to enable the animal to swallow naturally, whereby medicine may be administered without danger of spilling it and without injury to the animal treated. The bottle is provided at the upper end of its neck with an end wall 5, having a central perforation 6 for the passage of a rod 7, extending in advance of the outlets of the bottle and forming a stem for the valve 3. The valve is oppositely tapered and the inner end of the stem may be secured to the same in any suitable manner.

The bottom 8 is provided with a threaded portion 9, which engages interior screw threads 10 of the body of the bottle, a metallic ring 11 being preferably secured within the lower end of the body of the bottle to provide a reinforced thickened portion to be engaged by the threaded portion of the removable bottom. The threads form a liquid tight joint or connection. The bottom wall of the bottle is adapted to be removed to permit the bottle to be either filled or cleaned.

When the valve is on the seat formed by the neck, it prevents the escape of the contents when the bottle is inverted, and the stem 7 in this position projects from and extends in advance of the neck. The outer end of the stem is provided with an eye 12 to which is connected an operating cord 13, arranged in the form of a loop and adapted to be placed over the wrist of the hand holding the bottle, so that when the bottle is introduced into the mouth of an animal, the valve may be opened and the flow of liquid started by a simple bend or movement of the wrist. Also if the person administering the medicine to the animal should be compelled to move quickly, he may by simply holding onto the cord and releasing the bottle carry the device without spilling any of its contents. Instead of employing a cord, any other flexible connection may be used for operating the valve.

The drenching bottle may be made in various sizes to adapt it for administering various medicines to different kinds of animals.

Having thus fully described my invention, what I claim as new and desire to secure by Letters Patent, is:—

1. A device of the class described comprising a bottle having a tapered neck forming a valve seat and provided with an outlet located beyond the seat, an interiorly arranged valve provided with a stem extending in advance of the said outlet and projecting from the neck of the bottle when the valve is closed, and a flexible operating loop connected with the stem and adapted to be arranged on and operated by the wrist.

2. A device of the class described comprising a bottle having a removable bottom and provided with a tapering neck forming a valve seat and having an outlet, said neck being provided with an end wall having a perforation, a valve having a stem extending through the perforation of the end wall of the neck in advance of the outlet and projecting outwardly from the latter when the valve is closed, and operating means connected with the stem.

3. A drenching bottle having a flattened neck provided at an intermediate point with a lateral opening, said neck being closed at its outer end, an interiorly arranged valve having a stem extending through the closed end of the neck and projecting in advance of the said lateral opening, and an operating cord connected with the outer end of the stem.

In testimony, that I claim the foregoing as my own, I have hereto affixed my signature in the presence of two witnesses.

MILES LIVINGSTON.

Witnesses:
R. P. EASTON,
CLYDE M. EASTON.